(12) United States Patent
Das et al.

(10) Patent No.: US 11,409,551 B2
(45) Date of Patent: Aug. 9, 2022

(54) EMULATING VPID CORRECTLY FOR A NESTED HYPERVISOR

(71) Applicant: Red Hat, Inc., Raleigh, NC (US)

(72) Inventors: Bandan Das, Wakefield, MA (US); Karen Lee Noel, Pembroke, NH (US)

(73) Assignee: RED HAT, INC., Raleigh, NC (US)

( * ) Notice: Subject to any disclaimer, the term of this patent is extended or adjusted under 35 U.S.C. 154(b) by 569 days.

(21) Appl. No.: 15/442,897

(22) Filed: Feb. 27, 2017

(65) Prior Publication Data

US 2018/0246748 A1 Aug. 30, 2018

(51) Int. Cl.
*G06F 9/455* (2018.01)

(52) U.S. Cl.
CPC ...... *G06F 9/45558* (2013.01); *G06F 9/45533* (2013.01); *G06F 2009/4557* (2013.01); *G06F 2009/45566* (2013.01)

(58) Field of Classification Search
None
See application file for complete search history.

(56) References Cited

U.S. PATENT DOCUMENTS

| | | | |
|---|---|---|---|
| 8,856,789 B2 | 10/2014 | Torrey | |
| 9,152,571 B2 | 10/2015 | Kegel et al. | |
| 9,355,032 B2 | 5/2016 | Gschwind | |
| 2010/0138208 A1* | 6/2010 | Hattori | G06F 9/45558 703/25 |
| 2012/0131574 A1* | 5/2012 | Day, II | G06F 9/45558 718/1 |
| 2012/0216187 A1* | 8/2012 | Ben-Yehuda | G06F 9/45558 718/1 |
| 2012/0278800 A1* | 11/2012 | Nicholas | G06F 9/45558 718/1 |
| 2014/0006804 A1* | 1/2014 | Tkacik | G06F 21/53 713/192 |
| 2014/0365662 A1* | 12/2014 | Dave | G06F 9/45533 709/226 |
| 2014/0380009 A1 | 12/2014 | Lemay et al. | |
| 2015/0347169 A1* | 12/2015 | Tsirkin | G06F 9/45545 718/1 |
| 2016/0179701 A1 | 6/2016 | Eddy et al. | |
| 2017/0004002 A1* | 1/2017 | Nakamura | G06F 11/3433 |

(Continued)

FOREIGN PATENT DOCUMENTS

EP 2363805 A1 9/2011

OTHER PUBLICATIONS

Das et al., Nested Virtualization, State of the art and future directions (29 pages) Link: http://www.linux-kvm.org/images/3/33/02x03-NestedVirtualization.pdf.

(Continued)

*Primary Examiner* — Wynuel S Aquino
(74) *Attorney, Agent, or Firm* — K&L Gates LLP

(57) ABSTRACT

A system and method of emulating virtual processor identifiers includes a nested hypervisor requesting a virtual processor identifier, which identifies a virtual processor, the request triggering an exit to a host hypervisor. The host hypervisor identifies a request including the virtual processor identifier. The host hypervisor generates a key defining an association between a virtual machine and the virtual processor identifier. The host hypervisor stores the key.

18 Claims, 7 Drawing Sheets

(56) References Cited

U.S. PATENT DOCUMENTS

2018/0183580 A1* 6/2018 Scarlata ................ H04L 9/0861
2019/0155630 A1* 5/2019 Zhu ..................... G06F 9/45533

OTHER PUBLICATIONS

Zhang, Haozhong, Patchwork KVM: nVMX: remove incorrect vpid check in nested invvpid emulation, Nov. 25, 2015 (5 pages).
Nested virtualization with KVM/VMX or Guest inside guest in kvm in fedora linux, Dec. 14, 2011 (5 pages) Link: https://website-humblec.rhcloud.com/nested-kvmvmx-or-guest-inside-guest/.
Ben-Yehuda et al., The Turtles Project: Design and Implementation of Nested Virtualization, Jan. 4-6, 2010 (18 pages) Link: https://www.researchgate.net/publication/220851752_The_Turtles_Project_Design_and_Implementation_of_Nested_Virtualization.

\* cited by examiner

EMULATING VPID CORRECTLY FOR A NESTED HYPERVISOR

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for emulating virtual processor identifiers. An example method includes requesting, by a first nested hypervisor, a first virtual processor identifier, which identifies a first virtual processor. Responsive to requesting the first virtual processor identifier, a first exit is triggered to a host hypervisor. The host hypervisor identifies a first request including the first virtual processor identifier. The host hypervisor generates a first key defining an association between a first virtual machine and the first virtual processor identifier. The host hypervisor stores the first key.

Additional features and advantages of the disclosed methods and system are described in, and will be apparent from, the following Detailed Description and the Figures.

DETAILED DESCRIPTION OF EXAMPLE EMBODIMENTS

Figure 1:
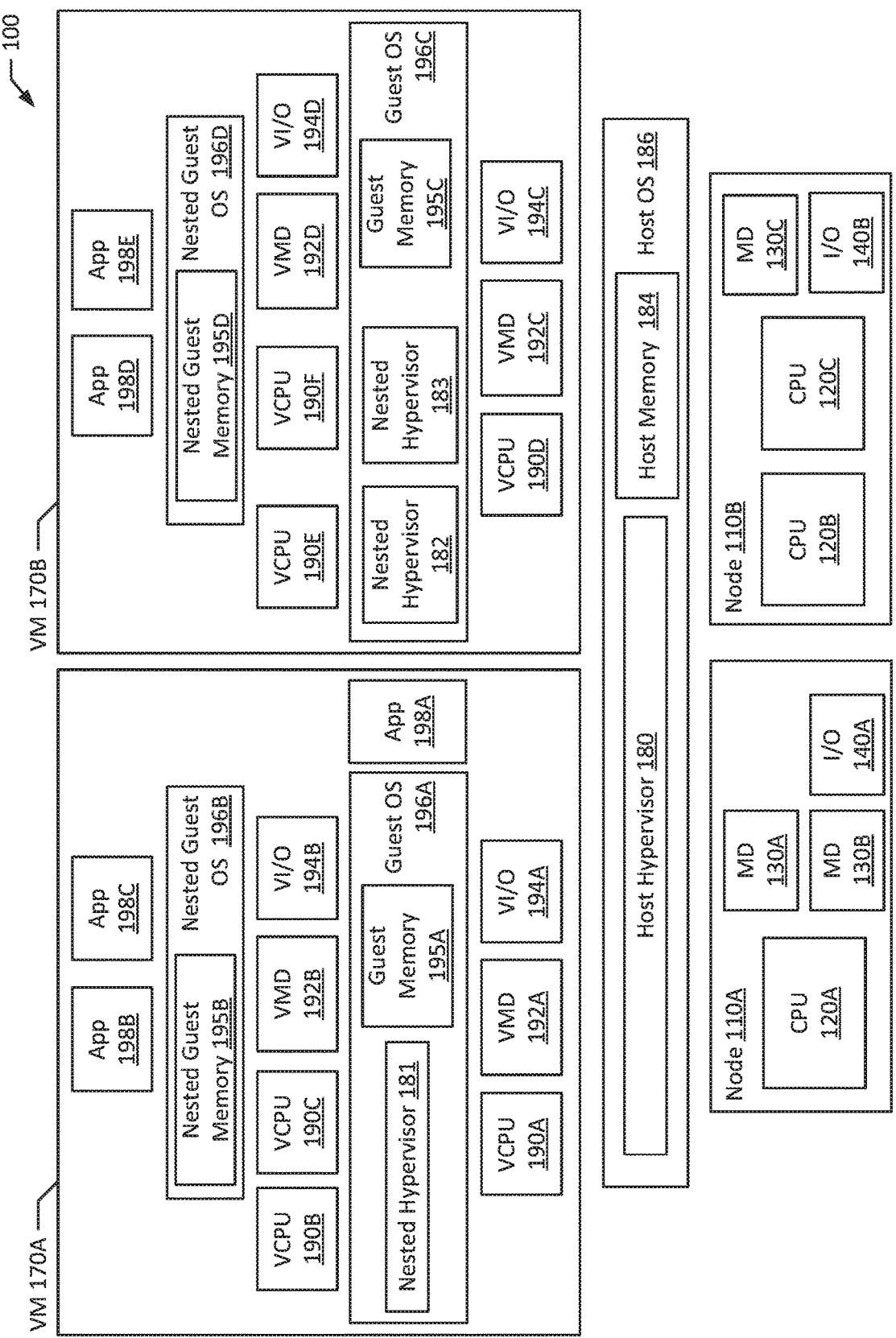
FIG. 1 is a block diagram of an example multi-processor computer system according to an example of the present disclosure.

In computer systems executing a guest virtual machine, a host hypervisor may typically manage interactions with virtualized devices, such as virtual processors, virtual memory devices, and virtual input-output devices. Likewise, computer systems with a host hypervisor may also implement one or more nested hypervisors. A nested hypervisor may be used as a desirable way to pass through typical hardware virtualization extensions for performance enhancement. In systems where one or more nested hypervisors are implemented (e.g., a nested hypervisor is virtualized on top of the host hypervisor), the nested hypervisor may support (or attempt to support) interactions with virtualized devices (e.g., a virtual processor above the nested hypervisor). Nonetheless, these virtualized devices are ultimately supported by the host hypervisor.

More specifically, in situations such as the one described above with a nested hypervisor, there may be several layers of device management. For example, a nested hypervisor may support a nested virtual processor. However, the nested hypervisor is sometimes unable to support device management. For example, invalidation commands may be unsupported, resulting in a production fault, which may crash the nested hypervisor. Therefore, in practice, the host hypervisor is supporting a second virtual processor (e.g., a non-nested virtual processor). The host hypervisor supports device management (e.g., invalidation commands) with this second virtual processor. It is desirable to keep track of various associations or relationships (e.g., between nested virtual processors and non-nested virtual processors), for example, if the computer system needs to invalidate mappings (e.g., translation mappings) related to a particular nested virtual processor.

A related feature, typically implemented in nested computer systems, is that of virtual processor identifiers. Computer systems may use virtual processor identifiers to identify individual virtual processors (e.g., non-nested virtual processors). However, in nested systems, the host hypervisor typically supports virtual processor identifiers by tagging all of the guest address spaces for all nested virtual processors with a single identifier. Subsequently, when a host hypervisor receives a request to invalidate an individual device (e.g., invalidate mappings associated with a virtual processor identifier for a particular nested virtual processor), the host hypervisor uses the identifier to locate the virtual processor, but invalidates the mappings associated with all of the tagged guest address spaces. While this approach may keep implementation simple, it leads to computing inefficiencies (e.g., inadvertently invalidating undesired mappings and/or addresses regarding particular nested virtual processors).

By emulating virtual processor identifiers for nested virtual processors, the host hypervisor can track and associate the nested virtual processors in a nested hypervisor. More particularly, the host hypervisor will generate keys, defining associations between virtual machines including the nested virtual processors and respective virtual processor identifiers, and store these keys. For example, keys may be counter values or inputs to hash functions. Accordingly, if invalidations of nested virtual processors are required, the host hypervisor only invalidates the mappings associated with the virtual processor identifiers for the correct nested virtual processors. The present disclosure describes advantageous systems and methods for hypervisor translation bypass to reduce overhead and increase efficiency of network function virtualization applications.

FIG. 1 depicts a high-level component diagram of an example multi-processor computer system 100 in accordance with one or more aspects of the present disclosure. The computer system 100 may include one or more interconnected nodes 110A-B. Each node 110A-B may, in turn, include one or more physical processors (e.g., CPU 120A-C)

communicatively coupled to memory devices (e.g., MD 130A-C) and input/output devices (e.g., I/O 140A-B). Likewise, in an example, nodes 110A-B may include a hardware device. In an example, a hardware device may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor, which is typically capable of executing one instruction at a time (or process a single pipeline of instructions), or a multi-core processor, which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, an input/output device 140A-B refers to a device capable of providing an interface between one or more processors and an external device. The external device's operation is based on the processor inputting and/or outputting data.

Processors 120A-C may be interconnected to additional processors using a variety of techniques, ranging from a point-to-point processor interconnect to a system area network, such as an Ethernet-based network. Local connections within each node 110A-B, including the connections between a processor 120A and a memory device 130A-B, between a processor 120A and an I/O device 140A, etc., may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device.

As noted above, computer system 100 may run multiple guest virtual machines (e.g., VM 170A-B), by executing a software layer (e.g., hypervisor 180, also referred to herein as host hypervisor 180) above the hardware and below the guest virtual machines 170A-B, as schematically shown in FIG. 1. In an example, the host hypervisor 180 may be a component of the host operating system 186 executed by the computer system 100. In another example, the host hypervisor 180 may be provided by an application running on the host operating system 186, or may run directly on the computer system 100 without an operating system beneath it. The host hypervisor 180 may virtualize the physical layer, including processors, memory, and I/O devices, and present this virtualization to guest virtual machines 170A-B as devices, including virtual processors (e.g., VCPU 190A/190D), virtual memory devices (e.g., VIVID 192A/192C), and/or virtual I/O devices (e.g., VI/O 194A/194C). A guest virtual machine 170A-B may run on any type of dependent, independent, compatible, and/or incompatible applications on the underlying hardware and OS 186.

In an example, applications 198A-E run on a guest virtual machine 170A-B may be dependent on the underlying hardware and/or OS 186. In another example, applications 198A-E run on a guest virtual machine 170A-B may be independent of the underlying hardware and/or OS 186. For example, applications 198A-C run on a first guest virtual machine 170A may be dependent on the underlying hardware and/or OS 186 while applications 198D-E run on a second guest virtual machine 170B are independent of the underlying hardware and/or OS 186. Additionally, applications 198A-E run on a guest virtual machine 170A-B may be compatible with the underlying hardware and/or OS 186. In an example, applications 198A-E run on a guest virtual machine 170A-B may be incompatible with the underlying hardware and/or OS 186. For example, applications 198A-C run on one guest virtual machine 170A may be compatible with the underlying hardware and/or OS 186 while applications 198D-E run on another guest virtual machine 170B are incompatible with the underlying hardware and/or OS 186. In an example, a device may be implemented as a guest virtual machine 170A-B.

In an example, a guest virtual machine 170A may execute a guest operating system (guest OS) 196A which may utilize the underlying VCPU 190A, VIVID 192A, and VI/O device 194A. One or more applications 198A-C may be running on a guest virtual machine 170A under the guest operating system 196A. Processor virtualization may be implemented by the host hypervisor 180 scheduling time slots on one or more physical processors 120A-C such, that from the guest operating system's perspective, those time slots are scheduled on virtual processor 190A.

Likewise, in an example, a guest virtual machine 170B may execute a guest operating system (guest OS) 196C which may utilize the underlying VCPU 190D, VIVID 192C, and VI/O device 194C. One or more applications 198D-E may be running on a guest virtual machine 170A under the guest operating system 196C. Processor virtualization may be implemented by the host hypervisor 180 scheduling time slots on one or more physical processors 120A-C such that, from the guest operating system's perspective, those time slots are scheduled on virtual processor 190D.

The host hypervisor 180 controls and limits access to memory (e.g., memory allocated to the guest virtual machines 170A-B and memory allocated to the guest operating systems 196A/196C, such as guest memory 195A/195C provided to guest operating systems 196A/196C, etc.). For example, guest memory 195A/195C may be divided into a plurality of memory pages. Access to these memory pages is controlled and limited by the host hypervisor 180. Likewise, for example, guest memory 195A/195C allocated to the guest operating system 196A/196C are mapped from host memory 184 such that when a guest application 198A-E or a device uses or accesses a memory page of guest memory 195A/195C it is actually using or accessing host memory 184. Host memory 184 may also be referred to as host physical memory 184, as it physically exists on a computer system (e.g., system 100). In an example, computer system 100 may include an input-output memory management unit, which may be used for mappings.

Each of the guest virtual machines 170A-B and, more particularly, each of the guest operating systems 196A/196C may include additional virtualized components, which are effectively supported by the host hypervisor 180 in a similar way. For example, guest operating system 196A may include a nested hypervisor 181. A nested guest operating system 196B and a nested guest memory 195B may run on the nested hypervisor 181. The nested hypervisor 181 may control and limit access to memory (e.g., memory allocated to the nested guest operating system 196B, such as nested guest memory 195B). The nested hypervisor 181 may virtualize a layer, including processors, memory, and I/O devices, and present this virtualization to guest virtual machine 170A as devices, including virtual processors (e.g., VCPU 190B-C), virtual memory devices (e.g., VIVID 192B), and/or virtual I/O devices (e.g., VI/O 194B). For example, nested hypervisor 181 has virtual processors (e.g., VCPU 190B, VCPU 190C, etc.) and related identifiers (e.g., 0, 1, etc.) allocated to it. However, in practice, the host hypervisor 180 is actually supporting device management (e.g., via VCPU 190A).

Similarly, for example, guest operating system 196C may include nested hypervisors 182/183. A nested guest operating system 196D and a nested guest memory 195D may run on at least one of the nested hypervisors 182/183. Either of nested hypervisors 182/183 may control and limit access to memory (e.g., memory allocated to the nested guest operating system 196D, such as nested guest memory 195D). The nested hypervisors 182/183 may virtualize a layer, including processors, memory, and I/O devices, and present this virtualization to guest virtual machine 170B as devices, including virtual processors (e.g., VCPU 190E-F), virtual memory devices (e.g., VIVID 192D), and/or virtual I/O devices (e.g., VI/O 194D). For example, nested hypervisors 182/183 have virtual processors (e.g., VCPU 190E, VCPU 190F, etc.) and related identifiers (e.g., 0, 1, etc.) allocated to it. However, in practice, the host hypervisor 180 is actually supporting device management (e.g., via VCPU 190D).

It is desirable to manage associations between devices virtualized by the host hypervisor 180 (e.g., VCPU 190A/190D) and devices virtualized by the nested hypervisors 181/182/183 (e.g., VCPU 190B/190C/190E/190F). More particularly, as noted previously, nested hypervisor 181 has virtual processors (e.g., VCPU 190B, VCPU 190C, etc.) and related identifiers (e.g., 0, 1, etc.) allocated to it; likewise, nested hypervisor 182 has virtual processors (e.g., VCPU 190E, VCPU 190F, etc.) and related identifiers (e.g., 0, 1, etc.) allocated to it. Because, in practice, the host hypervisor 180 is supporting device management (e.g., via VCPU 190A and VCPU 190B), it is desirable to define associations between the virtual processor identifier in the nested hypervisor (e.g., ID 0 in nested hypervisor 181 for VCPU 190B) and the actual virtual processor (e.g., 190A) used by the host hypervisor 180. This ensures, for example, that the host hypervisor 180 does not confuse VCPU 190B with other devices virtualized by the nested hypervisor 181 (e.g., VCPU 190C). For example, it would be undesirable for the host hypervisor 180 to invalidate mappings of a particular virtual processor identifier (e.g., the identifier for VCPU 190B), when it is supposed be invalidating mappings of a different virtual processor identifier (e.g., the identifier for VCPU 190C). Therefore, as described in greater detail below, the host hypervisor 180 may generate keys that define associations between particular devices (e.g., an association between VCPU 190B and VCPU 190A on VM 170A). These keys may be stored, for example, in host memory 184.

Figure 2:
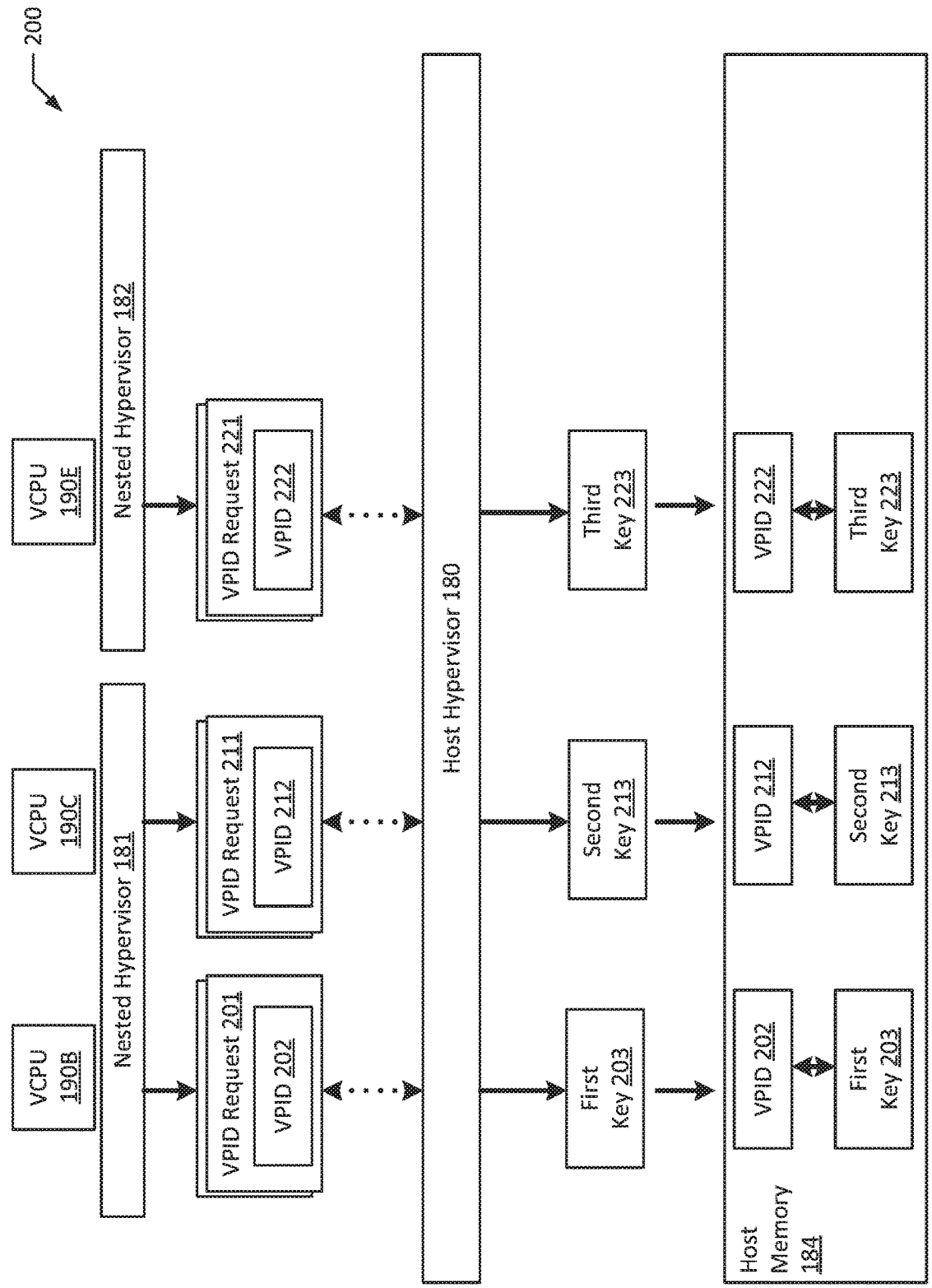
FIG. 2 is a block diagram illustrating an example system emulating virtual processor identifiers according to an example of the present disclosure.

FIG. 2 is a block diagram illustrating an example system emulating virtual processor identifiers according to an example of the present disclosure. More particularly, system 200 providing emulation includes a first virtual processor identifier request 201. The first virtual processor identifier (VPID) request 201 is a request for a first virtual processor identifier (VPID) 202. For example, first VPID 202 identifies a first virtual processor 190B running on the nested hypervisor 181. In various examples, first virtual processor 190B may also be referred to as a nested virtual processor. In an example, the first VPID request 201 is initially made by the nested hypervisor 181 and causes an exit to host hypervisor 180. Host hypervisor 180 identifies the first VPID request 201 and generates a first key 203. For example, first key 203 defines an association between a first virtual machine (e.g., virtual machine 170A and related virtual processor 190A on host hypervisor 180) and the first VPID 202. Host hypervisor 180 then stores the first key 203. In an example, the first key 203 defines an association between the first virtual processor 190B on the nested hypervisor 181 and the related virtual processor 190A on the host hypervisor 180. The first key 203 is stored in host memory 184.

Likewise, system 200 providing emulation includes a second VPID request 211. The second VPID request 211 is a request for a second VPID 212. For example, second VPID 212 identifies a second virtual processor 190C running on the nested hypervisor 181. In various examples, second virtual processor 190C may also be referred to as a nested virtual processor. In an example, the second VPID request 211 is initially made by the nested hypervisor 181 and causes an exit to host hypervisor 180. Host hypervisor 180 identifies the second VPID request 211 and generates a second key 213. For example, second key 213 defines an association between the first virtual machine (e.g., virtual machine 170A and related virtual processor 190A on host hypervisor 180) and the second VPID 212. Host hypervisor 180 then stores the second key 213. In an example, the second key 213 defines an association between the second virtual processor 190C on the nested hypervisor 181 and the related virtual processor 190A on the host hypervisor 180. The second key 213 is stored in host memory 184.

Likewise, system 200 providing emulation includes a third VPID request 221. The third VPID request 221 is a request for a third VPID 222. For example, third VPID 222 identifies a third virtual processor 190E running on the nested hypervisor 182. In various examples, third virtual processor 190E may also be referred to as a nested virtual processor. In an example, the third VPID request 221 is initially made by the nested hypervisor 182 and causes an exit to host hypervisor 180. Host hypervisor 180 identifies the third VPID request 221 and generates a third key 223. For example, third key 223 defines an association between a second virtual machine (e.g., virtual machine 170B and related virtual processor 190D on host hypervisor 180) and the third VPID 222. Host hypervisor 180 then stores the third key 223. In an example, the third key 223 defines an association between the third virtual processor 190E on the nested hypervisor 182 and the related virtual processor 190D on the host hypervisor 180. The third key 223 is stored in host memory 184.

Figure 3:
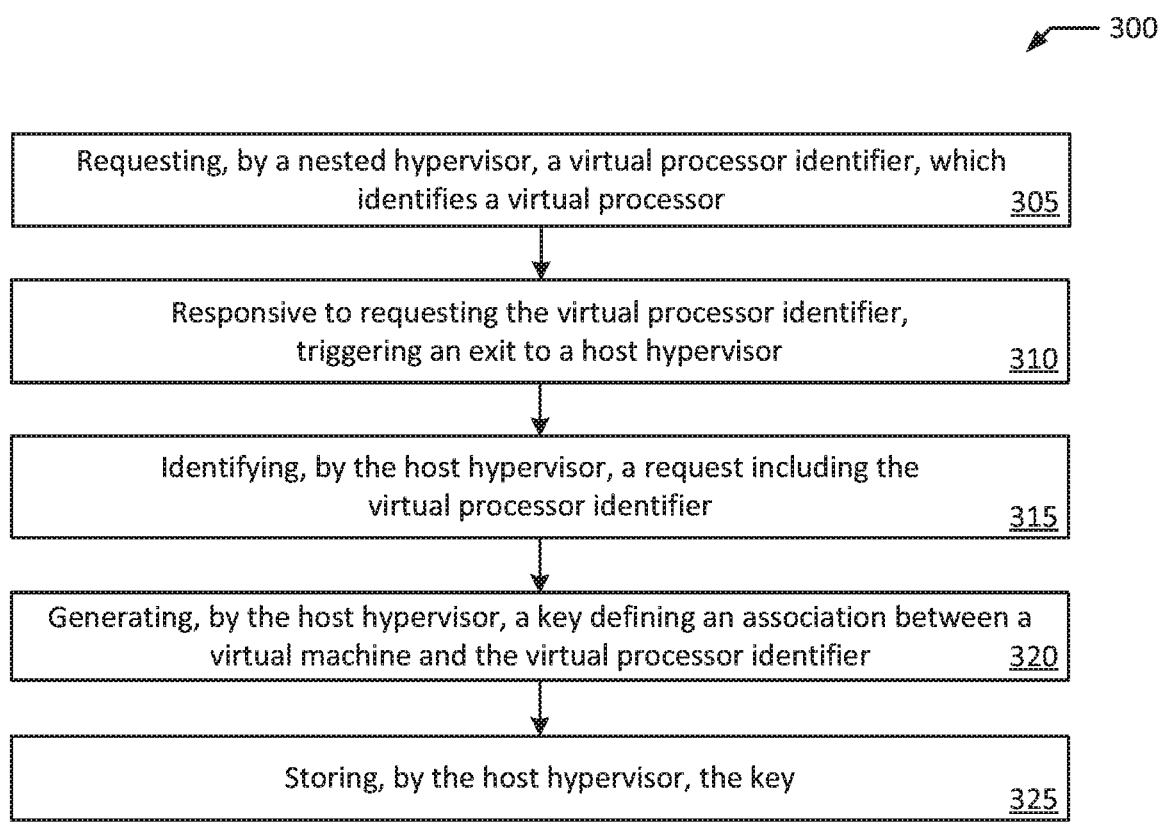
FIG. 3 is a flowchart illustrating an example method of emulating virtual processor identifiers according to an example of the present disclosure.

FIG. 3 is a flowchart illustrating an example method of emulating virtual processor identifiers according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by host hypervisor 180 interacting with first nested hypervisor 181, first virtual processor 190B, and first virtual machine 170A.

The example method 300 starts with requesting, by a nested hypervisor, a virtual processor identifier, which identifies a virtual processor (block 305). For example, first nested hypervisor 181 requests a first virtual processor identifier 202, which identifies first virtual processor 190B. The example method 300 further includes, responsive to requesting the virtual processor identifier, triggering an exit to a host hypervisor (block 310). For example, responsive to the first nested hypervisor 181 requesting the first virtual processor identifier 202, a first exit is triggered to host hypervisor 180.

The example method 300 further includes identifying, by the host hypervisor, a request including the virtual processor identifier (block 315). For example, host hypervisor 180 identifies a first request 201 (e.g., related to the request made by nested hypervisor 181) including the first virtual processor identifier 202, which identifies first virtual processor 190B. The example method 300 further includes generating, by the host hypervisor, a key defining an association between a virtual machine and the virtual processor identifier (block 320). For example, host hypervisor 180 generates first key 203, which defines an association between the first virtual machine 170A and the first virtual processor identifier 202. The example method 300 further includes storing, by the host hypervisor, the key (block 325). For example, host hypervisor 180 stores the first key 203. In an example, the first key 203 defines the association between a virtual processor on the nested hypervisor (e.g., first virtual processor 190B on first nested hypervisor 181) and a virtual processor on the host hypervisor (e.g., second virtual processor 190A on host hypervisor 180).

Figure 4A:
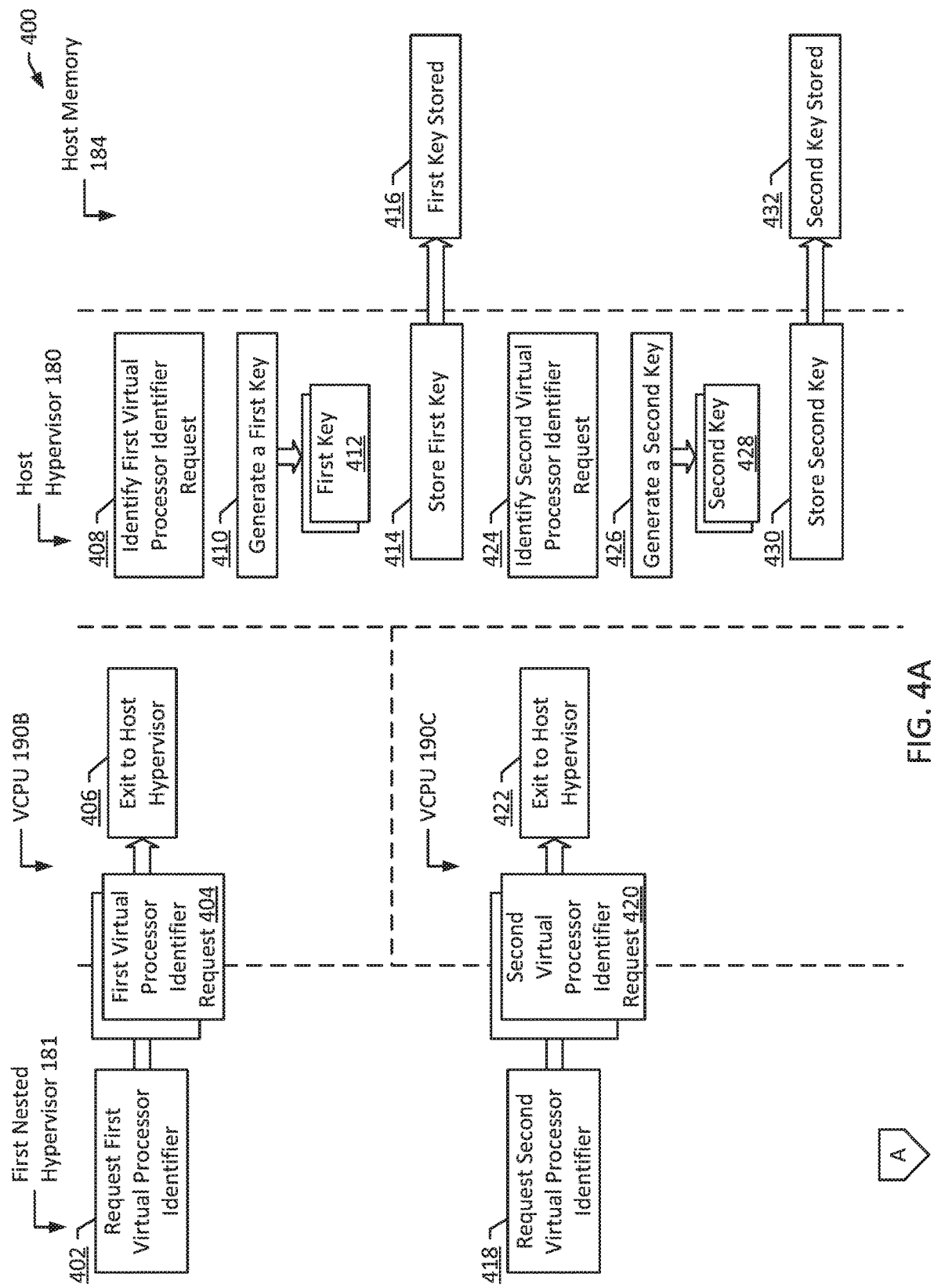
FIGS. 4A-C are flow diagrams illustrating virtual processor identifier emulation according to an example of the present disclosure.
Figure 4B:
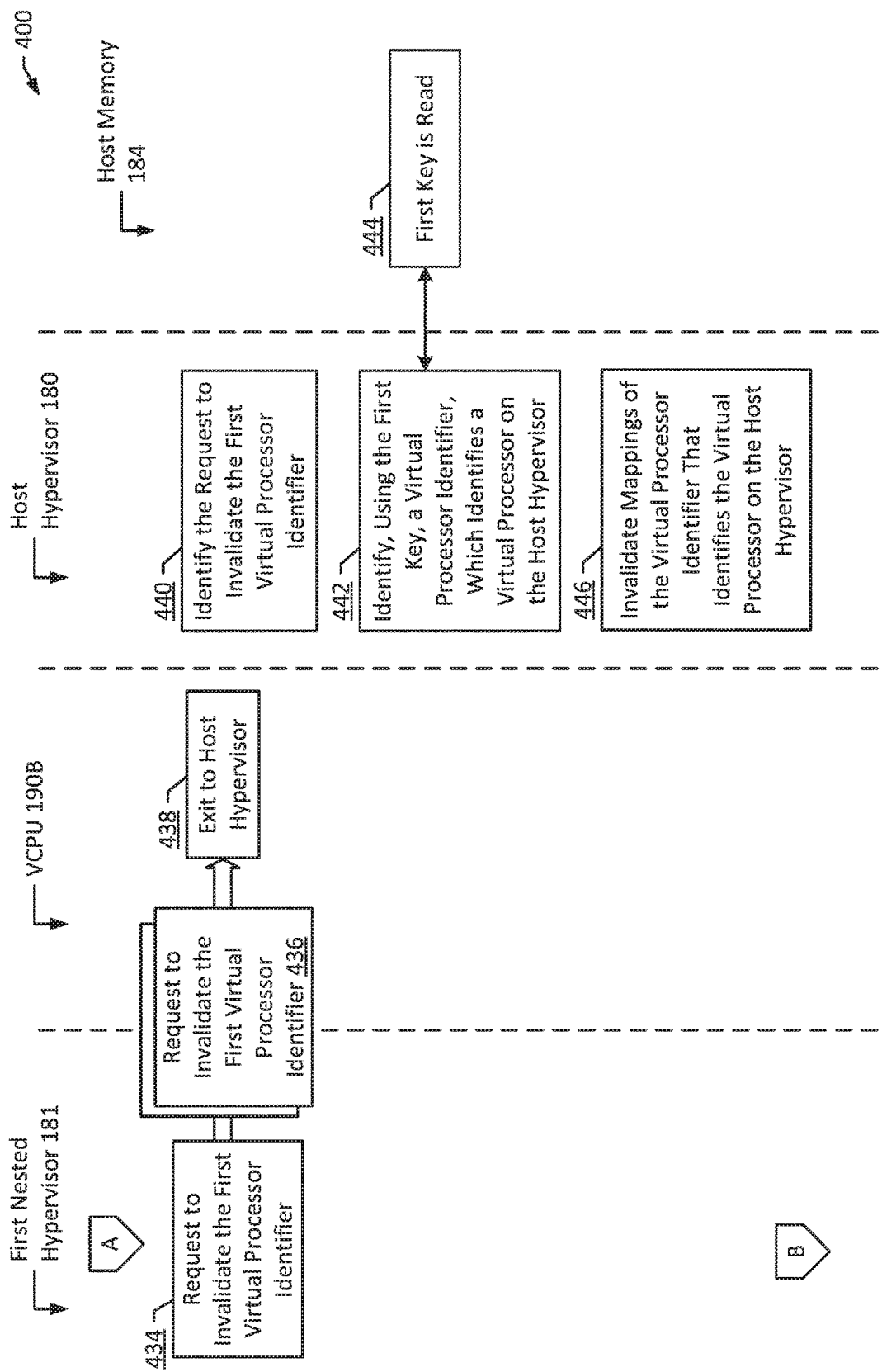
Figure 4C:
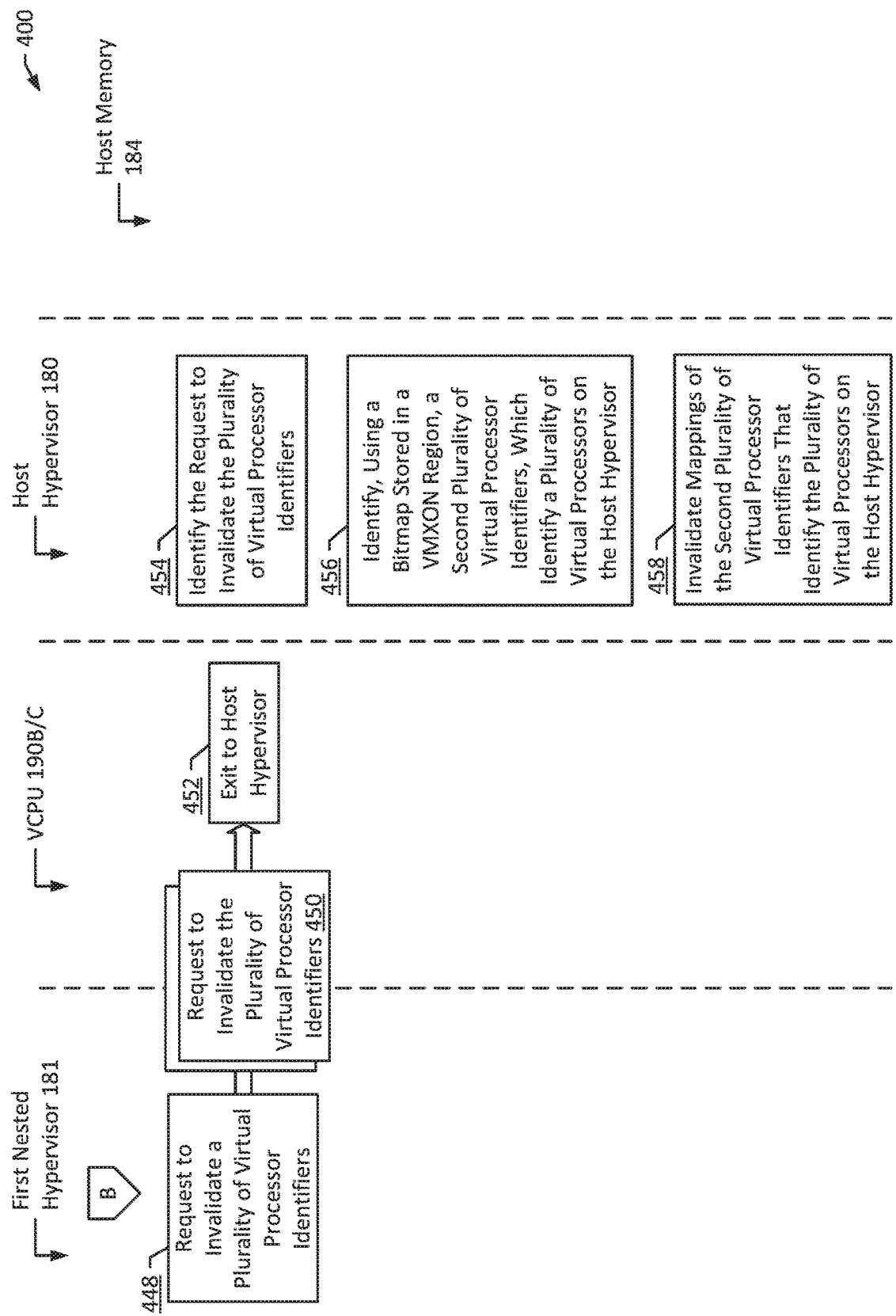

FIGS. 4A-C are flow diagrams illustrating virtual processor identifier emulation according to an example of the present disclosure. Although the example method 400 is described with reference to the flow diagram illustrated in FIGS. 4A-C, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method 400 may be performed by host hypervisor 180 interacting with first nested hypervisor 181, virtual processor 190B, virtual processor 190C, first virtual machine 170A, and host memory 184.

In the illustrated example in FIG. 4A, the first nested hypervisor 181 requests a first virtual processor identifier (VPID) (blocks 402 and 404). For example, the first VPID identifies a virtual processor 190B. Responsive to requesting the first VPID, an exit to the host hypervisor 180 is triggered (block 406). The host hypervisor 180 identifies a first request (e.g., the first virtual processor identifier request (block 404)) including the first VPID (block 408). The host hypervisor 180 generates a first key 412 defining an association between a first virtual machine (e.g., VM 170A) and the first VPID (block 410). In an example, the first key 412 is generated using an incrementing counter (e.g., the first key 412 is a counter value). In another example, the first key 412 is an input to a hash function. The host hypervisor 180 stores the first key 412 (blocks 414 and 416). In an example, the first key 412 identifies a relationship between the virtual processor 190B on the first nested hypervisor 181 and a virtual processor 190A on the host hypervisor 180.

In an example, the first key 412 is stored in host memory 184 (block 416). In a related example, the first key 412 is stored in a data structure. In another example, the first key 412 is stored in a 4 KB VMXON region of memory. In a related example, the VMXON region of the memory is marked as read-only (e.g., to prevent a malicious guest from accessing the region of memory). For example, write attempts to the VMXON region, after the VMXON instruction has been executed, triggers an exit to the host hypervisor 180, and subsequently injects an error to the nested hypervisor 181. In an example, the error halts the nested hypervisor 181.

Continuing on, the first nested hypervisor 181 requests a second VPID (blocks 418 and 420). For example, the second VPID identifies a virtual processor 190C. In an example, the first VPID and the second VPID are monotonically increasing VPIDs. Responsive to requesting the second VPID, an exit to the host hypervisor 180 is triggered (block 422). The host hypervisor 180 identifies a second request (e.g., the second virtual processor identifier request (block 420)) including the second VPID (block 424). The host hypervisor 180 generates a second key 428 defining an association between the first virtual machine (e.g., VM 170A) and the second VPID (block 426). The host hypervisor 180 stores the second key 428 (blocks 430 and 432). For example, the second key 428 is stored in host memory 184 (block 432).

In a related example, a second nested hypervisor (e.g., nested hypervisor 182) requests a third VPID. For example, the third VPID identifies a virtual processor (e.g., VCPU 190E). Responsive to requesting the third VPID, an exit to the host hypervisor 180 is triggered. The host hypervisor 180 identifies a third request (e.g., the third virtual processor identifier request) including the third VPID. The host hypervisor 180 generates a third key defining an association between a second virtual machine (e.g., VM 170B) and the third VPID. The host hypervisor 180 stores the third key.

In another related example, the host hypervisor 180 generates several keys, and stores related associations regarding the several keys, from the same initial request. For example, the first request (e.g., the first virtual processor identifier request (block 404) includes a plurality of virtual processor identifiers including the first VPID and a second VPID that respectively identify a plurality of virtual processors, including the virtual processor 190B and a virtual processor 190C. The host hypervisor 180 generates the first key 412, defining an association between the first virtual machine (e.g., VM 170A) and the first VPID, and generates the second key 428, defining an association between the first virtual machine (e.g., VM 170A) and the second VPID. The host hypervisor 180 stores the first key 412 and the second key 428.

Continuing on to FIG. 4B, the first nested hypervisor 181 requests to invalidate the first VPID (blocks 434 and 436). Responsive to requesting to invalidate the first VPID, an exit to the host hypervisor 180 is triggered (block 438). The host hypervisor 180 identifies the request (e.g., block 436) to invalidate the first VPID (block 440). The host hypervisor 180 identifies, using the first key 412, a virtual processor identifier, which identifies a virtual processor (e.g., VCPU 190A) on the host hypervisor 180 (blocks 442 and 444). For example, the first key 412 is read by the host hypervisor 180 in host memory 184. The host hypervisor 180 then invalidates mappings of the virtual processor identifier that identifies the virtual processor (e.g., VCPU 190A) on the host hypervisor 180 (blocks 446). Furthermore, in an example, the host hypervisor 180 invalidates the first key 412. In an example, invalidating the first key 412 means that the host hypervisor 180 invalidates translation mappings that are associated with another VPID based on the key (e.g., a VPID for the virtual processor 190A running on the host hypervisor 180).

In a related example, invalidating the mappings of the virtual processor identifier that identifies the virtual processor (e.g., VCPU 190A) on the host hypervisor 180 includes invalidating a plurality of mappings associated with the virtual processor 190A. In a related example, the invalidation of the plurality of mappings could be some of the mappings associated with the virtual processor 190A; in a different example, the invalidation of the plurality of mappings could be all of the mappings associated with the virtual processor 190A (e.g., global invalidation). For example, with global invalidation, no individual virtual processor identifier is requested; rather, upon request, all keys and related virtual processor identifiers are identified, and all associated mappings are invalidated.

It should be noted that, while the host hypervisor 180 invalidates mappings of the virtual processor identifier that identifies the virtual processor (e.g., VCPU 190A) on the host hypervisor 180 (block 446), there is not necessarily an affirmative deletion or removal of the related key. Rather, immediately or at some later point in time, the key is removed and overwritten (e.g., when a new key is generated and stored by the host hypervisor 180 regarding the same virtual processor identifier). Alternatively, a system shutdown, crash, etc. could lead to the key being deleted (e.g., the cache is wiped) upon restart of computer system 100.

Continuing on to FIG. 4C, the first nested hypervisor 181 requests to invalidate a plurality of VPIDs (e.g., first VPID and second VPID) (blocks 448 and 450). Responsive to requesting to invalidate the plurality of VPIDs, an exit to the host hypervisor 180 is triggered (block 452). The host hypervisor 180 identifies the request (e.g., block 450) to invalidate the plurality of VPIDs (block 454). The host hypervisor 180 identifies using a bitmap stored in a VMXON region, a second plurality of VPIDs, which identify a plurality of virtual processors on host hypervisor 180 (block 456). The host hypervisor 180 then invalidates mappings of the second plurality of virtual processor identifiers that identify the virtual processors (e.g., VCPU 190A, etc.) on the host hypervisor 180 (block 458). Furthermore, in an example, the host hypervisor 180 invalidates the plurality of keys related to a plurality of VPIDs. In an example, invalidating the plurality of keys means that the host hypervisor 180 invalidates translation mappings that are associated with another VPID based on the plurality of keys (e.g., VPIDs for VCPU 190A, etc. running on host hypervisor 180).

In a related example, the number of virtual processor identifiers allocated to each nested hypervisor is fixed (e.g., 16 total virtual processor identifiers per nested hypervisor). In this example, each nested hypervisor is limited to invalidating individual mappings up to the maximum number of identifiers allowed. For example, the nested hypervisor can invalidate individual mappings for each nested virtual processor related to each of the 16 total virtual processor identifiers. By comparison, if the nested hypervisor requests additional virtual processor identifiers beyond the maximum number of identifiers (e.g., four additional virtual processor identifiers), those additional virtual processor identifiers are all tagged to the same identifier (e.g., the 16th identifier), and mappings for those additional virtual processor identifiers would all be invalidated when any one of these (e.g., four) nested virtual processor identifiers is invalidated. By limiting the number of virtual processor identifiers, abuse may be prevented by, for example, a malicious actor requesting additional nested processors to cause the host hypervisor to run out of identifiers for other valid nested processors.

Figure 5:
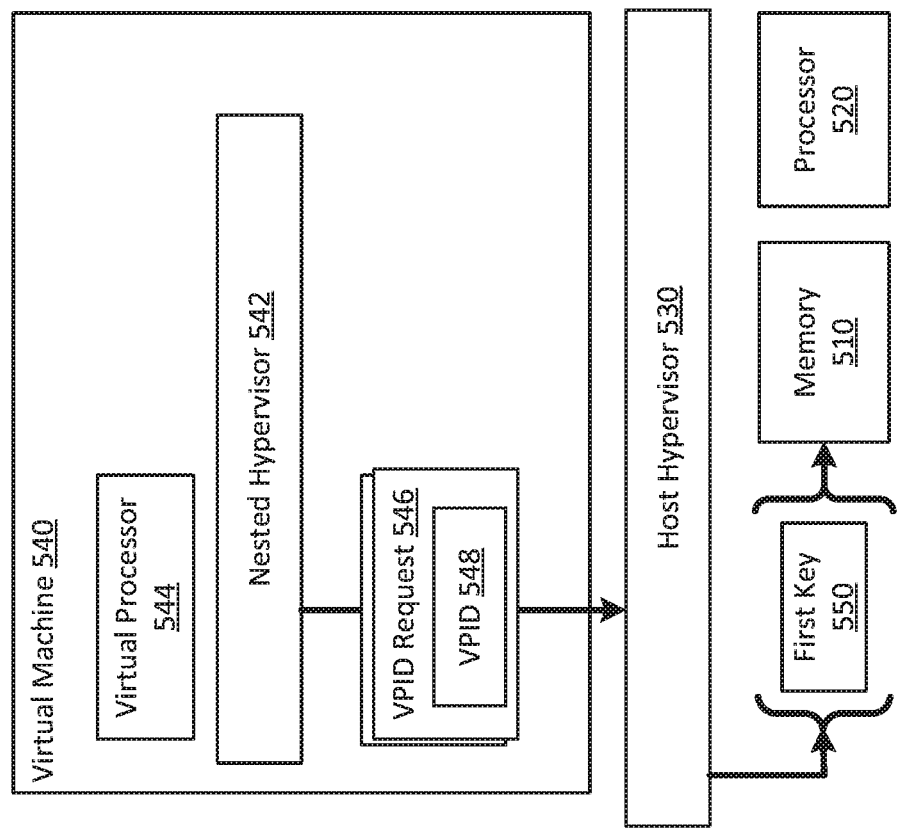
FIG. 5 is a block diagram of an example computer system according to an example of the present disclosure.

FIG. 5 is a block diagram of an example computer system 500 according to an example of the present disclosure. The computer system 500 may include a memory 510 and a processor 520 in communication with the memory 510. The computer system 500 may also include a host hypervisor 530 executing on the processor 520. The computer system 500 may also include a virtual machine 540 executing on the processor 520. The virtual machine 540 may include a nested hypervisor 542 and a first virtual processor 544 on the nested hypervisor 542. In an example, the first virtual processor 544 may also be referred to as a nested virtual processor. In an example, the virtual machine 540 may further include a second virtual processor on the host hypervisor 530.

The nested hypervisor 542 requests a first VPID 548, which identifies the first virtual processor 544. Responsive to requesting the first VPID 548, a first exit is triggered to the host hypervisor 530. The host hypervisor 530 identifies a first VPID request 546 including the first VPID 548. The host hypervisor 530 generates a first key 550 defining an association between the first virtual machine 540 (e.g., virtual machine 540 and a related second virtual processor on host hypervisor 530) and the first VPID 548. The host hypervisor 530 stores the first key 550 (e.g., in memory 510). Accordingly, example computer system 500 may advantageously emulate VPIDs correctly for a nested hypervisor through key generation and related storage of associations.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures. It should also be noted that a hypervisor may be referred to differently in various systems, for example, as a virtual machine monitor. Any program or component performing steps of the host hypervisor as described herein may be a hypervisor in accordance with the present disclosure.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:
1. A method comprising:
 requesting, by a first nested hypervisor, a first virtual processor identifier, which identifies a first virtual processor;
 responsive to requesting the first virtual processor identifier, triggering a first exit to a host hypervisor;

identifying, by the host hypervisor, a first request including the first virtual processor identifier;
generating, by the host hypervisor and based upon the identified first request, a first generated key, wherein the first generated key defines an individual relationship between the identified first virtual processor of the first nested hypervisor and a second virtual processor of the host hypervisor;
storing, by the host hypervisor, the first generated key;
requesting, by the first nested hypervisor, a second virtual processor identifier, which identifies the second virtual processor;
responsive to requesting the second virtual processor identifier, triggering a second exit to the host hypervisor;
identifying, by the host hypervisor, a second request including the second virtual processor identifier;
generating, by the host hypervisor and based upon the identified second request, a second generated key, wherein the second generated key defines an individual relationship between the identified second virtual processor on the nested hypervisor and a third virtual processor of the host hypervisor;
storing, by the host hypervisor, the second generated key;
determining mappings of virtual processor identifiers to invalidate using the first or second generated key; and
perform the invalidation of the determined mappings.

2. The method of claim 1, further comprising:
requesting, by a second nested hypervisor, a third virtual processor identifier, which identifies a third virtual processor;
responsive to requesting the third virtual processor identifier, triggering a third exit to the host hypervisor;
identifying, by the host hypervisor, a third request including the third virtual processor identifier;
generating, by the host hypervisor, a third generated key, wherein the third generated key defines an individual relationship between a second virtual machine and the third virtual processor identifier; and
storing, by the host hypervisor, the third generated key.

3. The method of claim 1, wherein the first virtual processor identifier and the second virtual processor identifier are monotonically increasing virtual processor identifiers.

4. The method of claim 1, wherein the first request includes a plurality of virtual processor identifiers including the first virtual processor identifier and a second virtual processor identifier that respectively identify a plurality of virtual processors, including the first virtual processor and a second virtual processor, further comprising:
generating, by the host hypervisor, a second generated key, wherein the second generated key defines an individual relationship between the first virtual machine and the second virtual processor identifier; and
storing, by the host hypervisor, the second generated key.

5. The method of claim 1, wherein the first generated key defines an individual relationship between the first virtual processor identifier, which identifies the first virtual processor on the first nested hypervisor, and a second virtual processor identifier, which identifies a second virtual processor on the host hypervisor.

6. The method of claim 5, further comprising:
requesting, by the first nested hypervisor, to invalidate the first virtual processor identifier;
responsive to a second request to invalidate the first virtual processor identifier, triggering a second exit to the host hypervisor;
identifying, by the host hypervisor, the second request to invalidate the first virtual processor identifier;
identifying, by the host hypervisor using the first generated key, the second virtual processor identifier, which identifies the second virtual processor on the host hypervisor; and
invalidating, by the host hypervisor, mappings of the second virtual processor identifier.

7. The method of claim 1, wherein the first generated key is generated using an incrementing counter.

8. The method of claim 1, wherein the first generated key is an input to a hash function.

9. The method of claim 1, wherein the first generated key is stored in a data structure.

10. The method of claim 1, wherein the first generated key is stored in a 4 KB VMXON region of a memory.

11. The method of claim 10, wherein the VMXON region of the memory is marked as read-only memory.

12. The method of claim 10, further comprising:
requesting, by the first nested hypervisor, to invalidate a first plurality of virtual processor identifiers;
responsive to a second request to invalidate the first plurality of virtual processor identifiers, triggering a second exit to the host hypervisor;
identifying, by the host hypervisor, the second request to invalidate the first plurality of virtual processor identifiers;
identifying, by the host hypervisor using a bitmap stored in the VMXON region, a second plurality of virtual processor identifiers, which identify a plurality of virtual processors on the host hypervisor; and
invalidating, by the host hypervisor, mappings of the second plurality of virtual processor identifiers.

13. A system comprising:
a memory;
one or more processors, in communication with the memory;
a host hypervisor, configured to execute on the one or more processors;
a first virtual machine, configured to execute on the one or more processors, the first virtual machine including:
a first virtual processor, and
a first nested hypervisor,
wherein the first nested hypervisor:
requests a first virtual processor identifier, which identifies the first virtual processor, and
responsive to requesting the first virtual processor identifier, triggers a first exit to the host hypervisor;
wherein the host hypervisor is configured to:
identify a first request including the first virtual processor identifier;
generate, based upon the identified first request, a first generated key, wherein the first generated key defines an individual relationship between the identified first virtual processor of the first nested hypervisor and a second virtual processor of the host hypervisor,
store the first generated key;
wherein the first nested hypervisor:
requests a second virtual processor identifier, which identifies the second virtual processor, and
responsive to requesting the second virtual processor identifier, triggers a second exit to the host hypervisor;
wherein the host hypervisor is configured to:
identify a second request including the second virtual processor identifier;
generate, based upon the identified second request, a second generated key, wherein the second generated key defines an individual relationship between the identified second virtual processor on the nested hypervisor and a third virtual processor of the host hypervisor, store the second generated key, determine mappings of virtual processor identifiers to invalidate using the first or second generated key, and perform the invalidation of the determined mappings.

14. The system of claim 13, further comprising:

a second virtual machine, configured to execute on the one or more processors, the second virtual machine including:

a third virtual processor, and a second nested hypervisor, wherein the second nested hypervisor:

requests a third virtual processor identifier, which identifies the third virtual processor, and responsive to requesting the third virtual processor identifier, triggers a third exit to the host hypervisor;

wherein the host hypervisor is configured to:

identify a third request including the third virtual processor identifier;

generate a third generated key, wherein the third generated key defines an individual relationship between the second virtual machine and the third virtual processor identifier; and store the third generated key.

15. The system of claim 13, wherein the host hypervisor is further configured to:

responsive to the first nested hypervisor requesting to invalidate the first virtual processor identifier and triggering a second exit to the host hypervisor, identify a second request to invalidate the first virtual processor identifier;

identify, using the first generated key, a second virtual processor identifier, the second virtual processor identifier identifying a second virtual processor on the host hypervisor; and invalidate mappings of the second virtual processor identifier.

16. The system of claim 13, wherein the first generated key is stored in a data structure.

17. The system of claim 13, wherein the first generated key is stored in a 4 KB VMXON region of the memory.

18. A computer-readable non-transitory storage medium comprising executable instructions that, when executed, are configured to cause a host hypervisor to:

identify a first request including a first virtual processor identifier, which identifies a first virtual processor;

generate, based upon the identified first request, a first generated key, wherein the first generated key defines an individual relationship between the identified first virtual processor of the first nested hypervisor and a second virtual processor of the host hypervisor;

store the first generated key;

identify a second request including a second virtual processor identifier;

generating, based upon the identified second request, a second generated key, wherein the second generated key defines an individual relationship between the identified second virtual processor on the nested hypervisor and a third virtual processor of the host hypervisor; and store the second generated key;

determine mappings of virtual processor identifiers to invalidate using the first or second generated key; and perform the invalidation of the determined mappings.

* * * * *